(12) United States Patent
Wang et al.

(10) Patent No.: US 11,192,812 B2
(45) Date of Patent: *Dec. 7, 2021

(54) COMPOSITE PHOSPHORUS-BASED CALCIFICATION INHIBITOR

(71) Applicant: GuangXi University, Nanning (CN)

(72) Inventors: Shuangfei Wang, Nanning (CN); Jian Zhang, Nanning (CN); Chengrong Qin, Nanning (CN); Ling Peng, Nanning (CN); Peng Gan, Nanning (CN); Shanshan Zhao, Nanning (CN); Zhiwei Wang, Nanning (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/864,283

(22) Filed: May 1, 2020

(65) Prior Publication Data

US 2021/0032140 A1 Feb. 4, 2021

(30) Foreign Application Priority Data

Jul. 31, 2019 (CN) .......................... 201910701262.3

(51) Int. Cl.
| | | |
|---|---|---|
| *C02F 5/08* | (2006.01) | |
| *C02F 3/28* | (2006.01) | |
| *C02F 1/66* | (2006.01) | |
| *C02F 103/06* | (2006.01) | |
| *C02F 103/28* | (2006.01) | |
| *C02F 103/32* | (2006.01) | |

(52) U.S. Cl.
CPC ............... *C02F 5/086* (2013.01); *C02F 1/66* (2013.01); *C02F 3/28* (2013.01); *C02F 2103/06* (2013.01); *C02F 2103/28* (2013.01); *C02F 2103/32* (2013.01)

(58) Field of Classification Search
CPC ...... C02F 5/14; C02F 1/66; C02F 3/28; C02F 5/086
USPC ................................................ 210/631, 697
See application file for complete search history.

(56) References Cited

U.S. PATENT DOCUMENTS

| | | | | |
|---|---|---|---|---|
| 3,623,991 A | * | 11/1971 | Sabatelli ................... | C02F 5/08 510/247 |
| 2010/0248151 A1 | * | 9/2010 | Tomita ...................... | G03F 7/24 430/306 |
| 2013/0256226 A1 | * | 10/2013 | Tanaka ................... | B01D 61/58 210/631 |

OTHER PUBLICATIONS

Van Langerak et al, "Influence of phosphate and iron on the extent of calcium carbonate precipitation during anaerobic digestion", Journal of Chemical Technology and Biotechnology, vol. 74, pp. 1030-1036 (Year: 1999).*

* cited by examiner

*Primary Examiner* — Claire A Norris
(74) *Attorney, Agent, or Firm* — LeonardPatel PC

(57) ABSTRACT

A phosphorus-based calcification inhibitor ("inhibitor") configured to prevent calcification of anaerobic granular sludge.

6 Claims, 1 Drawing Sheet

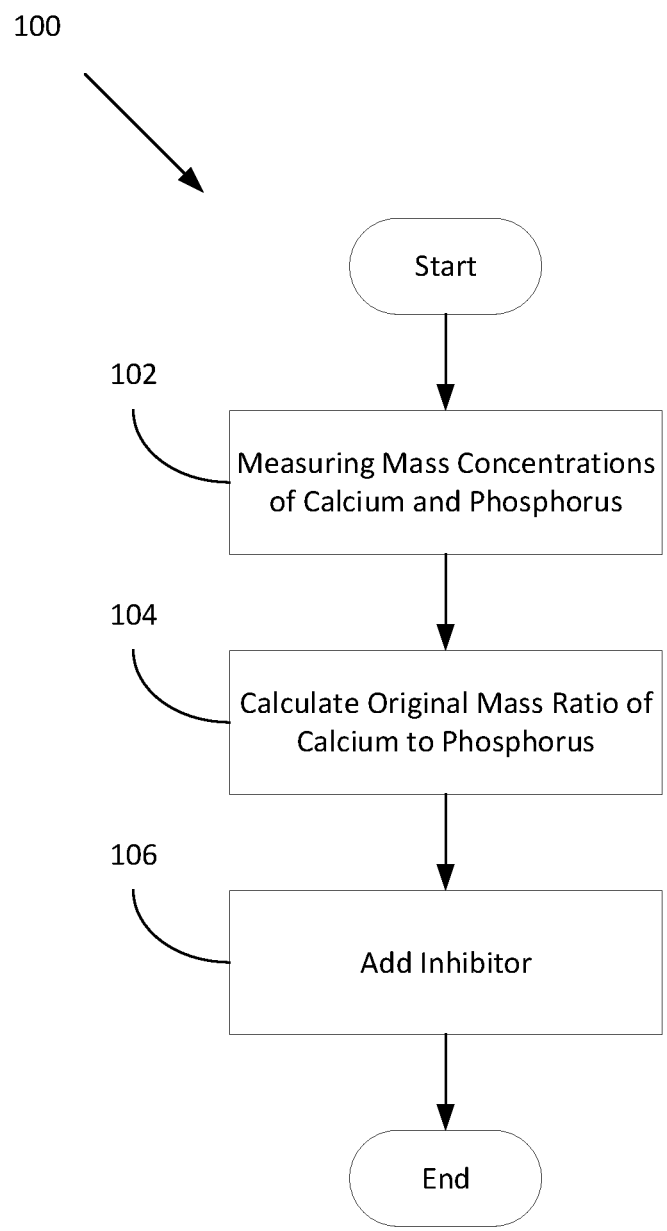

COMPOSITE PHOSPHORUS-BASED CALCIFICATION INHIBITOR

CROSS-REFERENCE TO RELATED APPLICATION

This application claims the benefit of Chinese Patent Application No. 201910701262.3, filed on Jul. 31, 2019. The subject matter thereof is hereby incorporated herein by reference in its entirety.

FIELD

The present invention relates to a calcification inhibitor, and more particularly, to a composite phosphorus-based calcification inhibitor configured to block calcification of anaerobic granular sludge and an application method.

BACKGROUND

Anaerobic biological treatment technology is suitable for high concentration organic wastewater, among which anaerobic granular sludge technology is widely utilized in the fields of pulping and papermaking, monosodium glutamate, bean/dairy product wastewater, landfill leachate, etc. The long-term practice of anaerobic granular sludge technology has shown that the high content of calcium ion ($Ca^{2+}$) in the initial wastewater leads to the accumulation of inorganic components such as calcium carbonate and hydroxyapatite in the anaerobic granular sludge. This reduces the total active microbial biomass in the anaerobic reactor, and causes the collapse of the anaerobic system. The above phenomenon is called "granular sludge calcification."

The existing prevention and control measures for granular sludge calcification contain pretreatment (e.g., controlling the pH value of influent, pre-decalcification softening, etc.), sludge management (e.g., calcification sludge discharge, screening, reflux culture, etc.), and microbial strengthening methods (e.g., adding specific fermentative hydrogen-producing and acid-producing bacteria to weaken the calcium precipitation microenvironment of anaerobic granular sludge). Microbial-induced calcite precipitation (MICP) refers to the precipitation of carbonate from supersaturated solution due to microbial cells and their biochemical activities. However, because of the stability of the internal microenvironment of anaerobic granular sludge, none of the above measures solve the internal calcification of granular sludge caused by the mechanism of MICP.

Accordingly, an improved calcification inhibitor may be beneficial.

SUMMARY

Certain embodiments of the present invention may provide solutions to the problems and needs in the art that have not yet been fully identified, appreciated, or solved by existing prevention and control measures. For example, some embodiments of the present invention pertain to a composite phosphorus-based calcification inhibitor configured to block calcification of anaerobic granular sludge and an application method.

In an embodiment, a composite includes a phosphorus-based calcification inhibitor ("inhibitor") configured to prevent calcification of anaerobic granular sludge. The includes 40 percent to 85 percent phosphoric acid, 10 percent to 25 percent sodium tripolyphosphate, and 5 percent to 25 percent sodium pyrophosphate.

In another embodiment, a method for prevent calcification of anaerobic granular sludge includes adding a composite phosphorus-based calcification inhibitor ("inhibitor") to an influent reservoir of an anaerobic reactor with a final mass ratio of calcium to phosphorus (20-35:1) in a treatment system of the anaerobic granular sludge for high calcium-containing wastewater.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1 is a flow diagram illustrating a process of applying the inhibitor, according to an embodiment of the present invention.

DETAILED DESCRIPTION OF THE EMBODIMENTS

Some embodiments generally solve the problem of granular sludge calcification caused by MICP, and provides a composite phosphorus-based calcification inhibitor and an application method configured to block the calcification of anaerobic granular sludge. Although technique is simple in operation, low in cost, reliable in practicability, the technique effectively prevents the calcification in the core of anaerobic granular sludge during the anaerobic treatment process of high calcium wastewater.

In an embodiment, the composite phosphorus-based calcification inhibitor (hereinafter the "inhibitor") prevents anaerobic granular sludge from calcification. The inhibitor may be composed of 40%-85% phosphoric acid, 10%-25% sodium tripolyphosphate, and 5%-25% sodium pyrophosphate by a mass component. It should be noted that when the pH of the feed water is low, the proportion of sodium tripolyphosphate and sodium pyrophosphate in the formula is higher.

In some further embodiments, the inhibitor is prepared by intermingling phosphoric acid, sodium tripolyphosphate, and sodium pyrophosphate, and dissolving the intermingled phosphoric acid, sodium tripolyphosphate, and sodium pyrophosphate with water, thereby producing an aqueous solution.

The inhibitor may be employed in the anaerobic treatment of high-calcium wastewater to prevent anaerobic granular sludge from calcifying. The high-calcium wastewater involves wastepaper pulping wastewater, food processing wastewater, landfill leachate, or fermentation wastewater.

The purpose of applying the inhibitor is to supplement a composite phosphorus-based calcification inhibitor to the influent of the anaerobic reactor with a final mass proportion of calcium to phosphorus (20-35:1) in the treatment system of anaerobic granular sludge for highly calcified wastewater.

FIG. 1 is a flow diagram illustrating a process 100 of applying the inhibitor, according to an embodiment of the present invention. In an embodiment, process 100 may begin at 102 with measuring mass concentrations of calcium ($Ca^{2+}$) and phosphorus ($P_2O_5^{3-}$) in high calcium-containing wastewater, and at 104, calculating the original mass ratio of calcium to phosphorus in highly calcified wastewater. At 106, an inhibitor is added to the influent reservoir of an anaerobic reactor to regulate the final mass ratio of calcium to phosphorus, according to the mass ratio of calcium to phosphorus (20-35:1).

TECHNICAL PRINCIPLES

In an embodiment, the inner calcium precipitation in a granular sludge is prevented by regulating the carbonate crystal morphology formed by MICP. The blocking mechanism is realized from the anions supplied by the inhibitor. These anions inhibit the calcium precipitation ions from arranging on the regular lattice through lattice distortion and dispersion. This way, the loose and fluffy amorphous calcium scale is inclined to attach to the surface layer of the granular sludge, and then eluted under hydraulic shearing, which makes it difficult to enter the anaerobic granular sludge to form calcium precipitation.

In a further embodiment, with the addition of sodium tripolyphosphate and sodium pyrophosphate, the impact of phosphoric acid on the pH of the influent water is alleviated. This mitigates the effect of the utilization of the inhibitor on the microenvironment of the anaerobic microorganism, and ensures that the performance of the anaerobic reactor is not adversely affected by the employment of the inhibitor.

ADVANTAGES

By preparing and applying the inhibitor, the precipitation form of calcium scale is changed. Further, the separation of calcium precipitation and anaerobic granular sludge is realized by hydraulic shearing and flexibly adjusting the agent dosage according to the mass ratio of calcium to phosphorus and pH value in the influent. The inhibitor may prevent and block the calcification process of anaerobic granular sludge, and ensures long-term stable and efficient treatment of high calcium wastewater in the anaerobic reactor.

After anaerobic treatment, the residual inhibitor can be used as the phosphorus resource required for the subsequent aerobic biological treatment. This may avoid the extra addition of the nutrients, such as active phosphorus, and the adverse impact on the effluent quality of the wastewater treatment system.

In some embodiments, by supplementing the inhibitor to the influent of the anaerobic reactor, the internal calcium precipitation in the granular sludge formed is inhibited by free calcium ion. Further, the inhibitor maintains the activity of the anaerobic granular sludge. By preventing calcium precipitation in the sludgecore and calcification deactivation, the inhibitor solves the problem of reducing the capacity of anaerobic reaction system due to sludge calcification deactivation in the fields of waste paper pulping, food processing, landfill leachate, fermentation, without sludge removal and descaling in the anaerobic reactor.

EXAMPLE EMBODIMENTS

The calcium ion interception rate is used as the reference standard for the calcification blocking of anaerobic granular sludge, and is calculated by the concentration of influent and effluent in the anaerobic reactor. See Equation (1) below $$r = \frac{C_{In} - C_{Out}}{C_{In}} \times 100\%$$ Equation (1)

where r is the calcium ion interception rate %; $C_{In}$ and $C_{Out}$ are the calcium ion concentration of influent and effluent in the anaerobic reactor, respectively.

Example 1

The Treatment of Waste Paper Pulp Wastewater

Typical quality of wastepaper and pulping wastewater are COD 1500-5000 mg/L, $Ca^{2+}$ 300-1200 mg/L, total phosphorous 0.5-2 mg/L, pH value 6.2-7.5.

Since the pH value of the wastewater is close to the pH range of anaerobic granular sludge, the inhibitor is close to neutral, as shown in the formula: 65% phosphoric acid, 20% sodium tripolyphosphate, 15% sodium pyrophosphate, dissolved in water and obtain ten wt % aqueous solution to prepare a composite phosphorus-based calcification inhibitor;

According to the actual calcium ion concentration of the wastewater, the dosage of the inhibitor per ton of water is calculated based on the mass ratio of calcium to phosphorus (25-30:1). Thereafter, the inhibitor is added to the influent regulating reservoir of the anaerobic reactor.

The control experiments showed that the addition of the inhibitor could significantly inhibit the interception of calcium ions by anaerobic granular sludge in the anaerobic reactor, reducing the interception rate of calcium ions from 23.8%-333% to 7.7-15%.

TABLE 1

A Control Experiment On The Treatment Of Waste Paper Pulp Wastewater With Various Calcium Ion Concentration

| $C_{In}$, mg/L | Addition or not | $C_{Out}$, mg/L | Average interception rate (r), % |
|---|---|---|---|
| 300 | N | 90-110 | 33.3 |
|  | Y | 245-265 | 15.0 |
| 600 | N | 390-420 | 32.5 |
|  | Y | 520-565 | 9.5 |
| 900 | N | 660-710 | 23.8 |
|  | Y | 815-845 | 7.7 |
| 1200 | N | 910-988 | 20.6 |
|  | Y | 87-140 | 8.7 |

Example 2

The Treatment of Landfill Leachate

Typical quality of landfill leachate is COD 5000-20000 mg/L, $Ca^{2+}$ 250-800 mg/L, total phosphorous 5-25 mg/L, ammonia nitrogen 400-1600 mg/L, pH value 8.0-8.5. Since the pH value of the wastewater is alkaline and ammonia nitrogen concentration is high, the inhibitor needs to appear acidic, as shown in the formula: 85% phosphate, 10% sodium tripolyphosphate, 5% sodium pyrophosphate, dissolved in water and mixed evenly to obtain ten wt % aqueous solution to prepare a composite phosphorus-based calcification inhibitor.

According to the actual calcium ion concentration of the wastewater, the dosage of the inhibitor per ton of water is calculated based on the mass ratio of calcium to phosphorus (25-30:1). Thereafter, the inhibitor was added to the influent regulating reservoir of the anaerobic reactor.

The control experiments showed that the addition of the inhibitor could significantly inhibit the interception of calcium ions by anaerobic granular sludge in the anaerobic reactor, reducing the interception rate of calcium ions from 28.5%-36.5% to 8.9%-10.6%.

TABLE 2

A Control Experiment On The Treatment Of Landfill Leachate With Various Calcium Ion Concentration

| $C_{In}$, mg/L | Addition or not | $C_{Out}$, mg/L | Average interception rate (r), % |
|---|---|---|---|
| 250 | N | 168-190 | 28.5 |
|  | Y | 202-227 | 10.6 |
| 500 | N | 305-344 | 35.1 |
|  | Y | 420-473 | 8.9 |
| 800 | N | 486-528 | 36.5 |
|  | Y | 698-740 | 10.2 |

Example

The Treatment of Fermentation Wastewater

The typical quality of fermentation wastewater is COD 18000-40000 mg/L, $Ca^{2+}$ 250-1000 mg/L, total phosphorous 15-45 mg/L, ammonia nitrogen 13000-16000 mg/L, pH value 2.2-2.6. Since the pH value of the wastewater is acidic, the inhibitor needs to appear alkaline, as shown in the formula: 40% phosphate, 25% sodium tripolyphosphate, 25% sodium pyrophosphate, dissolved in water and mixed evenly to obtain ten wt % aqueous solution to prepare a composite phosphorus-based calcification inhibitor.

According to the actual calcium ion concentration of the wastewater, the dosage of the inhibitor per ton of water is calculated based on the mass ratio of calcium to phosphorus (25-30:1). Thereafter, the inhibitor is added to the influent regulating reservoir of the anaerobic reactor.

The control experiments showed that the addition of the inhibitor could significantly inhibit the interception of calcium ions by anaerobic granular sludge in the anaerobic reactor, reducing the interception rate of calcium ions from 25.5%-33.7% to 9.8%-12.7%.

TABLE 3

A Control Experiment On The Treatment Of Fermentation Wastewater With Various Calcium Ion Concentration

| $C_{In}$, mg/L | Addition or not | $C_{Out}$, mg/L | Average interception rate (r), % |
|---|---|---|---|
| 250 | N | 159-211 | 25.5 |
|  | Y | 198-232 | 12.7 |
| 500 | N | 310-364 | 32.8 |
|  | Y | 420-473 | 10.2 |
| 1000 | N | 586-717 | 33.7 |
|  | Y | 846-940 | 9.8 |

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method for prevent calcification of anaerobic granular sludge, comprising:
   adding a composite phosphorus-based calcification inhibitor ("inhibitor") to an influent reservoir of an anaerobic reactor with a final mass ratio of calcium to phosphorus (20-35:1) in a treatment system of the anaerobic granular sludge for high calcium-containing wastewater, the adding of the inhibitor is for anaerobic microorganism treatment of wastewater, wherein
   the inhibitor comprises 40 percent to 85 percent phosphoric acid, 10 percent to 25 percent sodium tripolyphosphate, and 5 percent to 25 percent sodium pyrophosphate, and
   the pH in the anaerobic reactor is between 6.2 and 7.5.

2. The method of claim 1, further comprising:
   determining mass concentrations of calcium ($Ca^{2+}$) and phosphorus ($P_2O^{3-}_5$) in the high calcium-containing wastewater; and
   calculating an original mass ratio of calcium to phosphorus in the high-calcium wastewater.

3. The method of claim 2, wherein the adding of the inhibitor to the influent reservoir comprises regulating a final mass ratio of calcium to phosphorus according to a proportion of calcium to phosphorus being equal to 20-35:1.

4. The method of claim 1, further comprising:
   forming the inhibitor by mixing of the phosphoric acid, the sodium tripolyphosphate, and the sodium pyrophosphate and dissolving the phosphoric acid, the sodium tripolyphosphate, and the sodium pyrophosphate in water.

5. The method of claim 1, further comprising:
   incorporating the inhibitor with anaerobic treatment of high-calcium wastewater to avoid the calcification of the anaerobic granular sludge.

6. The method of claim 1, wherein the high-calcium wastewater comprises one or more of wastepaper pulping wastewater, food processing wastewater, landfill leachate, and fermentation wastewater.

* * * * *